United States Patent [19]

Tsuruta

[11] 4,118,715
[45] Oct. 3, 1978

[54] ELECTRONIC PHOTOFLASH HAVING A TERMINAL BOARD

[75] Inventor: Yuzo Tsuruta, Tokyo, Japan

[73] Assignee: Sunpak Corporation, Tokyo, Japan

[21] Appl. No.: 767,120

[22] Filed: Feb. 9, 1977

[30] Foreign Application Priority Data

Sep. 6, 1976 [JP] Japan .......................... 51-118864[U]

[51] Int. Cl.² .............................................. G03B 15/05
[52] U.S. Cl. .................................. 354/33; 354/60 L; 354/128
[58] Field of Search ............... 354/53, 60 L, 33, 32, 354/289, 127–129, 145, 147, 35; 340/253 B, 275, 221, 421

[56] References Cited

U.S. PATENT DOCUMENTS

| | | | |
|---|---|---|---|
| 2,455,365 | 12/1948 | Jenner | 354/128 X |
| 2,998,548 | 8/1961 | Girard | 354/128 X |
| 3,971,050 | 7/1976 | Okuno et al. | 354/145 X |
| 3,997,775 | 12/1976 | Stoneham | 354/145 X |
| 3,999,193 | 12/1976 | Hasegawa | 354/60 L X |

Primary Examiner—L. T. Hix
Assistant Examiner—William B. Perkey
Attorney, Agent, or Firm—Robert I. Pearlman

[57] ABSTRACT

An electronic photo flash capable of being used in cameras which are constructed so that only the special flash of the trade name "Flip Flash" is used as an artificial light source. The electronic photo flash has a terminal board to be plugged into the flash socket which is for mounting the flash of such camera. With the apparatus of the present invention, it is possible to check whether or not the terminal board has been plugged positively into the flash socket by indicator means whose visual state will change to provide an indication of a positive connection.

5 Claims, 5 Drawing Figures

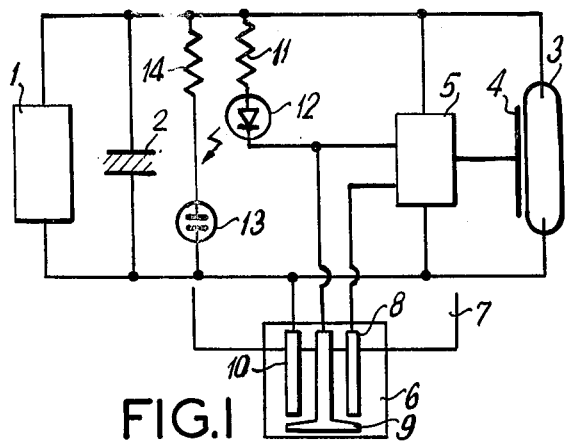
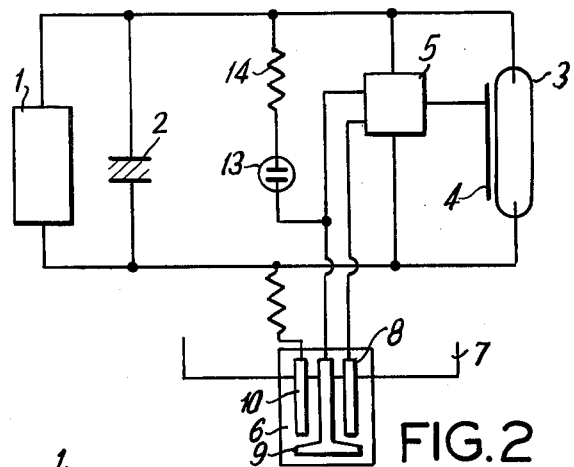
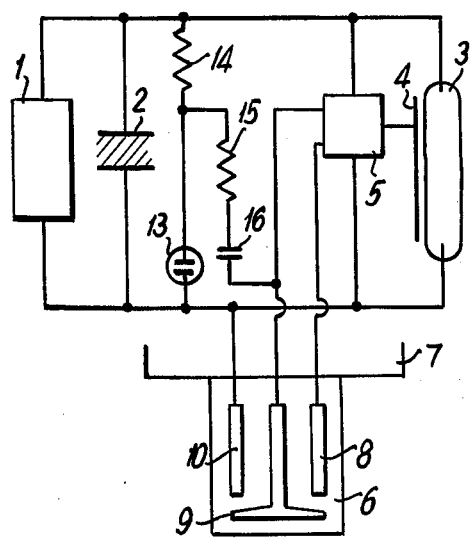
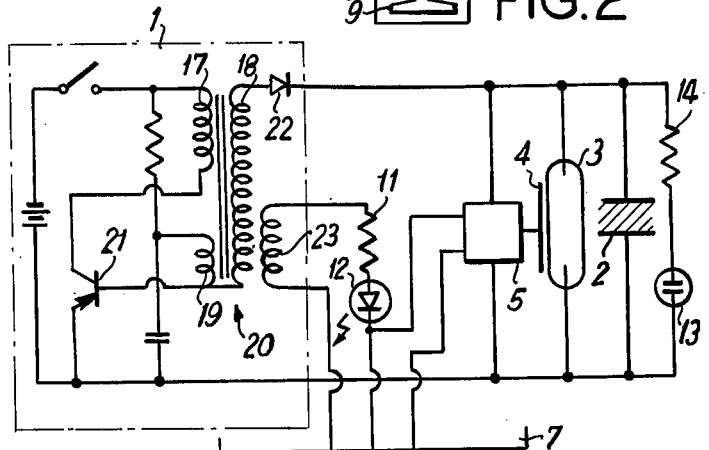
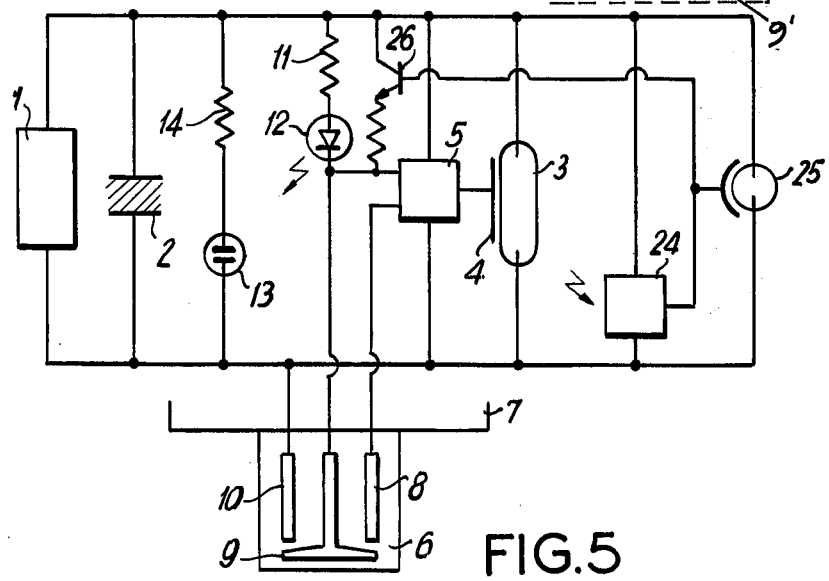
FIG.1
FIG.2
FIG.3
FIG.4
CAMERA
FIG.5

ELECTRONIC PHOTOFLASH HAVING A TERMINAL BOARD

BACKGROUND OF THE INVENTION

This invention relates to an electronic photo flash to be used as an artificial light source in photography.

Portable electronic photo flashes are generally fitted in the shoe of a camera by means of a foot. Consequently, they cannot be used in cameras without a shoe. Recently, there is an increasing number of cameras having a special flash socket and not having a shoe. The present invention is concerned with an electronic photo flash to be used in such special cameras, and particularly those cameras designed to use a flash in which eight lamps are arranged longitudinally in two rows in an elongated case and terminal boards to be plugged into the flash socket are mounted at both ends of the case. Upon plugging one terminal board into the flash socket and taking a photograph, the upper four lamps emit light successively, and when turning the case upside down and plugging the other terminal board into the flash socket and taking another photograph, the remaining four lamps emit light successively in the same manner as above (this type of flash has the trade name "Flip Flash," and the "flash" referred to herein means a flash having the aformentioned terminal board). Therefore, the electronic photo flash of the present invention must have a terminal board of the same shape as the flash. Since the foregoing flash is light, it can mechanically be fixed to camera by only plugging a terminal board into the flash socket. On the other hand, an electronic photo flash is heavy and so plugging a terminal board into the flash socket alone will make it unstable. For this reason, an electronic photo flash must be provided with another fixture means for fixation to the camera.

In using an electronic photo flash, therefore, it is necessary that it should be attached to the camera by suitable fixture means and at the same time the terminal board should be pluggd into the flash socket. In this case, an incomplete plugging of the terminal board into the flash socket sometimes occurs because, unlike the case of the flash, the plug-in of the terminal board will not adequately support the electronic photo flash. In an electronic photo flash, a terminal mounted on a terminal board receives an electric signal from the camera and emits light. Therefore, if the terminal board is not plugged positively into the camera's flash socket, no flash light is emitted even when releasing the shutter of the camera and consequently, the photography fails.

SUMMARY OF THE INVENTION

It is an object of the present invention to provide an electronic photo flash capable of preventing a failure in photography caused by an incomplete plugging or connection of a flash terminal board into the flash socket of camera.

Another object of the invention is to provide an electronic photo flash capable of checking in advance whether or not the plug-in of the terminal board into the flash socket of camera is complete.

On a terminal board are mounted three terminals. On the other hand, within the flash socket of the camera are also mounted three receiver terminals (i.e. receptacles) which are brought into contact with the terminals of the said terminal board when the latter has been plugged into the flash socket. Of the three receiver terminals of the flash socket, two are normally in a condition of short-circuit, to one of which and also the remaining one of the receiver terminals is applied an electric signal when the shutter has been released.

The present invention utilizes the normally shorted condition of the two receiver terminals of the flash socket. Towards this end, indicator means which change its state of indication upon occurence of a partial short-circuit is mounted in an electronic photo flash. More specifically, such indicator means is mounted between the terminals which are shorted upon plugging of the terminal board into the flash socket. That is, when a terminal board has been plugged into the flash socket of camera in a perfect or complete manner, the terminals of the two are brought into electrical contact and the terminal on the terminal board to which is connected the indicator means is shorted by a shorted receiver terminal in the flash socket, whereupon the indicator means operates to change its state of indication. The simplest way is to use a light emitting diode as the indicator means, so that it will light upon occurrence of a short-circuit of terminal. For economic reasons, it is recommended to use a neon tube for indicating the completion of the preparation of the flash for light emission which is generally used in general electronic photo flashes so that it will turn on and off, i.e. flicker, upon occurrence of a short circuited terminal.

Thus, according to the present invention, indicator means, e.g. a light emitting diode, operates when a terminal board has been plugged into the flash socket of the camera, but it will not operate when such plugging is incomplete, so that the user can be aware before taking a photograph, whether or not the plugging of a terminal board into the flash socket of camera is complete and if not, the user can make it complete. As a result, a failure of taking a photograph can be prevented.

BRIEF DESCRIPTION OF THE DRAWING

FIGS. 1 through 5 are circuit diagrams of the electronic photo flash of the present invention.

DESCRIPTION OF THE PREFERRED EMBODIMENT

In FIG. 1, the reference numeral 1 is a DC high-voltage power source which is obtained by increasing voltage and rectification of a commerical AC power supply or oscillationwise increasing voltage and rectification with a DC-DC converter circuit using a low-voltage battery. A high-voltage battery may of course also be employed. Numeral 2 is a storage capacitor which is charged from the power source 1, and 3 is a flash tube having a trigger electrode 4 as a third electrode in addition to an anode and a cathode. When a high-voltage pulse is applied from a trigger circuit 5 (conventionally connected with source 1) to the trigger electrode 4, the gas inside the flash tube is ionized and the discharge is initiated. Since the anode and the cathode of the flash tube 3 are connected to the anode and the cathode of the storage capacitor 2, the electric charge of the storage capacitor 2 is discharged upon initiation of the discharge and light is emitted. In this embodiment, the electronic photo flash is provided at the bottom of a case 7 with a terminal board 6 which is to be plugged into the flash socket 6' of the camera shown schematically in FIG. 4. On the surface of the terminal board 6 are mounted three electroconductor terminals 8, 9 and 10. When the terminal board 6 has been plugged into the flash socket 6', these terminals are respectively brought into an electric contact with three receiver terminals 8', 9' and 10' mounted within the flash socket, 9' and 10' of which are normally short-circuited as shown in FIG. 4. As a result, a pulse is applied between the terminals 8 and 9. When releasing the shutter of the camera (shown schematically in FIG. 4) and the terminals 9 and 10 are normally shorted. The terminals 8 and 9 are connected to the input of the trigger circuit 5 for applying an input turn-on signal thereto, and to the terminal 9 are connected a resistor 11 and a light emitting diode 12 as indicator means, the resistor 11 being connected to the anode of the storage capacitor 2. The light emitting diode 12 is disposed in a position of the case 7 where its light emission is visible. Further, the terminal 10 is connected to the cathode of the storage capacitor 2. With such a construction, when the terminals 9 and 10 have been shorted after charging the storage capacitor 2, an electric current flows in seriatum through the storage capacitor 2, resistor 11, light emitting diode 12, terminal 9, terminal 10, and back to storage capacitor 2, whereupon the light emitting diode 12 lights. The terminals 9 and 10 short only when the terminal board 6 has been plugged completely into the flash socket of camera and contact the normally shorted receiver terminals 9' and 10', and so, whether or not the terminal board 6 has been plugged positively into the flash socket can be judged by seeing whether or not the light emitting diode 12 lights. A positive plugging of the terminal board 6 into the flash socket indicates that the terminals 8 and 9 are also in a positive contact with the respective terminals in the flash socket. Upon releasing the shutter (i.e., represented by closing switch S), a pulse is applied to the terminals 8 and 9 and is inputted to the trigger circuit 5, thus properly biasing the trigger circuit components so that there is applied a high-voltage pulse to the trigger electrode 4 of the flash tube 3 to allow the flash tube 3 to discharge. As a result, the light required for photography can be obtained from the flash tube 3.

These premise that the storage capacitor 2 is sufficiently charged from the power source 1. In order to check the state of charging, a circuit consisting of a resistor 14 and a neon tube 13 is connected in parallel with the storage capacitor 2. The neon tube 13, which is mounted so as to be visible from the exterior, is a conventional neon tube adapted to go on when the charged voltage of the storage capacitor 2 has reached a value sufficient to emit light. Therefore, when the neon tube 13 lights and the light emitting diode 12 does not light, it means that the plugging of the terminal board 6 into the flash socket is not complete.

However, keeping the light emitting diode 12 and the neon tube 13 simultaneously in a lit condition in uneconomical and so, as shown in FIG. 2, the neon tube 13 may be connected to the place and in lieu of the light emitting diode 12. In this case, that is with one neon tube, the charging state of the storage capacitor 2 and the plug-in state of the terminal board 6 can be checked at the same time. On the other hand, in case the neon tube 13 does not light, it is impossible to judge whether it is attributable to an incomplete charging of the storage capacitor or to an incomplete plug-in of the terminal board 6.

An example of the construction aimed at eliminating such a drawback is shown in FIG. 3. As in FIG. 1, a voltage indicating circuit consisting of the resistor 14 and neon tube 13 is connected in parallel with the storage capacitor 2. Further in parallel with the neon tube 13 connected through the terminals 9 and 10 is a discharging circuit consisting of a resistor 15 and a capacitor 16. With such a construction, before plugging the terminal board 6 into the flash socket, the neon tube 13 functions in the same way as in conventional neon tubes, that is, it is for indicating the charged condition of the storage capacitor 2, that is, for indicating the completion of the preparation of the electronic photo flash for light emission. Once the terminal board 6 has been plugged into the flash socket resulting in the terminals 9 and 10 being shorted, the neon tube 13 is shorted by the discharge circuit and so it goes off. Thereafter, when the capacitor 16 has been charged to a level sufficient to light the neon tube 13, the neon tube 13 again goes on. Upon decrease of the voltage of the capacitor 16 due to the lighting of the neon tube 13, the latter again goes off. In this way, as long as the terminals 9 and 10 are in a condition of short-circuit, the neon tube 13 repeats going on and off (i.e, flickering), indicating that the terminal board 6 is plugged positively into the flash socket. In contrast therewith, as long as the terminals 9 and 10 are not shorted, the neon tube 13 remains lit, indicating that the plugging of the terminal board 6 into the flash socket is incomplete. In the case where the neon tube 13 remains lit and also in the case where it repeatedy flashes (flickering), the neon tube 13 indicates that the storage capacitor 2 is charged sufficiently and that if the flash tube 3 is discharged and light emitted, there will be obtained a light enough for taking photographs. Thus, with only one neon tube 13, it is possible to check both the state of the flash preparation for light emission and the plug-in state of the terminal board.

All the foregoing embodiments are of a construction such that the indicator means is operated by the charged voltage of the storage capacitor 2. With such a construction, when the storage capacitor 2 is not sufficiently charged, the indicator means does not operate until the storage capacitor 2 is sufficiently charged (for several seconds) even with the power switch turned on and the terminal board plugged completely into the flash socket. As a result, the user may feel uneasy for a moment. In order to eliminate such uneasiness, it is necessary for the indicator means to operate simultaneously with the turning-on of the power switch. This is accomplished, for example, in the manner shown in FIG. 4.

In the embodiment of FIG. 4, there is used as the power source 1 a well-known DC-DC converter circuit consisting of an oscillator transformer 20 having a primary winding 17, a secondary winding 18 and a feedback winding 19, a transistor 21 and a diode 22. To the secondary winding is connected a third winding 23, so that upon turning on the power switch 24, a voltage is developed in the winding 23 and this voltage actuates the indicator means consisting of the light emitting diode 12 and the resistor 11. In this case, as necessary, flashing can be accomplished by using the resistor 15 and capacitor 16 shown in FIG. 3.

It is well known that electronic photo flashes involve the so-called "computer electronic photo flash." In the computer electronic photo flash, as shown in FIG. 5, the light emitted from the flash tube 3 and reflected from the object is measured by a control circuit 24, and when the brightness has reached an optimum value for photography, a stop signal is issued and a quench tube 25 is operated to stop the discharge of the flash tube 3. In some known computer electronic photo flashes, the quench tube 25 is not used and instead a switching element, e.g. SCR, is connected in series with the flash tube 3 and is turned off with a stop signal from the control circuit 24 to thereby stop the discharge of the flash tube 3. Such computer electronic photo flashes are very convenient because the emission of light can be controlled automatically. However, in case the distance from the object is too far, it is impossible to give sufficient light to the object and sometimes an under exposed photograph results. To prevent this, it is necessary to check whether the object was in a range capable of obtaining an appropriate light exposure. Toward this end, it is well known that detector means is provided so as to let the user know whether or not an appropriate exposure was obtained judging from whether there is any output signal from the control circuit 24, whether the quench tube is operated, etc. Also in this case, indication is made using means which make a visual judgement possible, such as a light emitting diode. Consequently, in case the present invention is used in a computer electronic photo flash, with reference to the embodiment of FIG. 1, there are provided as many as three kinds of warning means, that is, the light emitting diode 12, the neon tube 13 and a light emitting diode of the foregoing detector means. This is, needless to say, very troublesome for the user.

In view of the above, the detector means in a computer electronic photo flash and the indicator means for letting the user know the plug-in state of the terminal board 6 have been combined together. This is exemplified in FIG. 5, in which there is connected in parallel with the indicator means consisting of the resistor 11 and light emitting diode 12 as in FIG. 1, a transistor 26 as a switching element which temporarily operates with an output signal from the control circuit 24.

Accordingly, when the terminal board 6 has been plugged into the flash socket and the preparation for photography is completed, the light emitting diode 12 lights in the same manner as set forth hereinbefore. Now, if the shutter is released and a pulse applied between the terminals 8 and 9, the flash tube 3 will discharge and emit light. With the emitted light, the object is illuminated. At this moment, the brightness is measured by the control circuit 24 and when it has reached a level meeting the photography condition, a stop signal is issued and the quench tube 25 operates to stop the discharge of the flash tube 3 and at the same time operates the transistor 26, whereupon the light emitting diode 12 goes off. Thus, the user is made aware that the object was photographed with an appropriate exposure. In case the object is located far away and cannot fully be illuminated with the light from the flash tube 3, no stop signal is issued from the control circuit 24. Consequently, the transistor 26 does not operate and so the light emitting diode 12 remains lit. That is, the object is in an under-exposed condition. Accordingly, if a preliminary emission of light is made before taking a photograph to confirm that the light emitting diode 12 goes off, there will be no failure of the photograph.

What is claimed is:
1. In an electronic photo flash for use in cameras having a flash socket, said flash socket having a plurality of receiver terminals of which at least two are normally in a short-circuited condition, and which emits light by discharging with a flash tube the electric charge of a storage capacitor which is charged from a power source, said electronic photo flash having a control circuit which measures the brightness of an object being photographed issuing a stop signal to stop the discharge of said flash tube when said brightness has reached an optimum level for taking the photograph, wherein the improvement comprises a terminal board plugged into the flash socket of said camera, terminals mounted on said terminal board and brought into contact with the receiver terminals in the flash socket of said camera, indicator means connected to a terminal of said terminal board which is shorted to another terminal of said terminal board when the terminal board is plugged into the flash socket of said camera by the two normally shorted receiver terminals in the flash socket, said indicator means emitting a light upon such terminal shorting, and a switching element connected in parallel with said indicator means and conducting temporarily said stop signal from the control circuit whereby said indicator means is temporarily turned off.

2. The electronic photo flash of claim 1 wherein said indicator means is connected across the collector and emitter of a transistor, bias means connected with the base of said transistor for applying a bias thereto for a predetermined time with said stop signal from the control circuit.

3. In an electronic photo flash for use in cameras having a flash socket, said flash socket having a plurality of receiver terminals of which at least two are normally in a short-circuited condition, and which emits light be discharging with a flash tube the electric charge of a storage capacitor which is charged from a power source, wherein the improvement comprises a terminal board plugged into the flash socket of said camera, terminals mounted on said terminal board and brought into contact with the receiver terminals in the flash socket of said camera, and indicator means connected to a terminal which is shorted to another terminal when the terminal board is plugged into the flash socket of the camera by the two normally shorted receiver terminals in the flash socket, said indicator means changing its visual state when said terminals are shorted, and a power source comprising a DC-DC converter circuit having an oscillation coil which is connected to another winding, said indicator means connected to one side of said another winding and said another terminal connected to the other side of said another winding, whereby the visual state of said indicator means changes in response to the voltage developed in said another winding.

4. The electronic photo flash of claim 3 wherein said indicator means comprises a light emitting diode which flashes when said terminals are shorted.

5. The electronic photo flash of claim 3 wherein said indictor means goes on and off when said terminals are shorted.

* * * * *